United States Patent
Patteson et al.

(10) Patent No.: US 9,537,882 B2
(45) Date of Patent: Jan. 3, 2017

(54) METHODS, SYSTEMS, AND DEVICES FOR DETECTING AND ISOLATING DEVICE POSING SECURITY THREAT

(71) Applicant: FedEx Corporate Services, Inc., Collierville, TN (US)

(72) Inventors: Christopher Perry Patteson, Germantown, TN (US); Edward Michael Maier, Collierville, TN (US); Michael Jesse Mings, Cordova, TN (US)

(73) Assignee: FEDEX CORPORATED SERVICES, INC., Collierville, TN (US)

( * ) Notice: Subject to any disclaimer, the term of this patent is extended or adjusted under 35 U.S.C. 154(b) by 3 days.

(21) Appl. No.: 14/577,405

(22) Filed: Dec. 19, 2014

(65) Prior Publication Data
US 2016/0182554 A1 Jun. 23, 2016

(51) Int. Cl.
*H04L 29/06* (2006.01)
*G06F 21/56* (2013.01)

(52) U.S. Cl.
CPC .......... *H04L 63/1433* (2013.01); *G06F 21/56* (2013.01); *H04L 63/1441* (2013.01)

(58) Field of Classification Search
CPC ........................ H04L 63/1433; H04L 63/1441
See application file for complete search history.

(56) References Cited

U.S. PATENT DOCUMENTS

| | | | | |
|---|---|---|---|---|
| 6,202,153 B1* | 3/2001 | Diamant | ................. | G06F 21/55 726/35 |
| 2007/0237158 A1* | 10/2007 | Leef | ....................... | H04L 12/24 370/395.53 |
| 2009/0083852 A1* | 3/2009 | Kuo | ...................... | G06F 21/564 726/22 |
| 2009/0100521 A1* | 4/2009 | Fu | ......................... | G06F 21/567 726/24 |
| 2011/0047594 A1* | 2/2011 | Mahaffey | .............. | G06F 21/564 726/1 |
| 2011/0047620 A1* | 2/2011 | Mahaffey | .............. | G06F 21/564 726/23 |

(Continued)

OTHER PUBLICATIONS

Chen et al., A Model-based Approach to Self-Protection in Computing System, Aug. 5-9, 2013, ACM Proceeding Cloud and Autonomic Computing Conference.*

(Continued)

*Primary Examiner* — Luu Pham
*Assistant Examiner* — Harvey Cohen
(74) *Attorney, Agent, or Firm* — Finnegan, Henderson, Farabow, Garrett & Dunner LLP

(57) ABSTRACT

Methods and systems are disclosed for detecting a security threat. The methods and systems comprise detecting that a first device is coupled with the first I/O interface, responsive to the detection that the first device is coupled with the first I/O interface, temporarily disabling data communication between the first and second I/O interfaces, acquiring a file from the detected first device via the first I/O interface, determining whether the acquired file poses a security threat, and responsive to a determination that the acquired file does not pose a security threat, enabling the data communication between the first and second I/O interfaces.

17 Claims, 4 Drawing Sheets

(56) References Cited

U.S. PATENT DOCUMENTS

| | | | |
|---|---|---|---|
| 2011/0197280 A1* | 8/2011 | Young | G06F 21/552 726/24 |
| 2013/0247191 A1* | 9/2013 | Balasubramanian | G06F 21/562 726/23 |
| 2015/0271142 A1* | 9/2015 | Oliphant | G06F 21/554 726/12 |

OTHER PUBLICATIONS

Tanachaiwiwat et al., On the Performance Evaluation of Encounter-based Worm Interactions Based on Node Characteristics, Ming Hsieh Dept of EE, University of S. California, ACM Proceedings Challenged Networks, Sep. 2007.*

Wattanapongsakorn et al., A Network-based Internet Worm Intrusion Detection and Prevention System, IEEE IT Convergence and Security (ICITCS), 2013, pp. 1-4.*

Bai et al., Detecting Malicious Behavior Using Critical API-calling Graph Matching, 2009 First International Conference on Information Science and Engineering, 2009, pp. 1716-1719.*

Maggi et al., Integrated Detection of Anomalous Behavior of Computer Infrastructures, 2012, IEEE Network Operations and Management Symposium, pp. 866-871.*

* cited by examiner

METHODS, SYSTEMS, AND DEVICES FOR DETECTING AND ISOLATING DEVICE POSING SECURITY THREAT

TECHNICAL FIELD

The present disclosure relates to the field of computer security and, more particularly, methods, systems, and devices for detecting and isolating devices posing security threat.

BACKGROUND

Non-volatile storage devices, such as Secure Digital (SD), Memory Stick™, flash memory, solid-state drive (SSD), portable hard drive, etc., provide a convenient medium for users to store and transfer computer files. However, these devices, acting as a transporter of computer files, are also very prone to be infected with computer viruses and other malicious programs, when they are plugged into a computer system to upload or download a computer file. The risk of infection is high when people use a public computer to access their private non-volatile storage device—as long as one user, out of many, plugs in an infected device to the public computer without first scanning the device for computer virus or malware, the public computer will be very likely infected, and the infected public computer will then spread the virus or malware to the storage devices of other users. The risk is even higher for public computers located in high traffic public areas like print centers, coffee shops, hotels, photo centers, etc., where it is expected that many users will use the public computers to access their storage devices in order to print documents or photos. One solution to this problem is dedicating a person to operate the public computer for these users, and to scan their storage devices before accessing their content. However, this is not economical from the business standpoint, and runs counter to the purpose of providing these public computers—to offer the users a form of self-service.

Moreover, even if the user runs a virus or malware scan over their storage devices before accessing the devices with the public computer, security loopholes still exist. First, running a scan over the storage devices, after connecting the storage devices to an infected computer, does not protect the storage devices from being infected by the computer. Second, while it is common for antivirus or malware detection software to quarantine suspicious files, the computer where the software operates nevertheless has to read the file into the computer's memory and, before undergoing the quarantining operation, the computer can still transmit the malware to other devices connected to the computer via input/output (I/O) interfaces. Third, given that typically antivirus and malware detection software can only detect virus and malware that are known, the software provides no protection when the malware or virus is newly-created and is not known.

SUMMARY

In view of the foregoing, it is desirable to provide a threat-detection system that can act as a gateway between the aforementioned public computer and a private storage device, where the threat-detection system can automatically detect security threats for both the public computer and the private storage device, and allow the computer and the device to communicate with each other only after ascertaining that neither the computer nor the storage device poses security threat.

Embodiments of the present disclosure provide a robust apparatus and method for detecting a security threat. The apparatus comprises a first input/output (I/O) interface and a second I/O interface, a memory device that stores a set of instructions, and a processor capable of executing the set of instructions. In some embodiments, the processor is capable of executing the set of instructions to cause the apparatus to detect that a first device is coupled with the first I/O interface, and responsive to the detection that the first device is coupled with the first I/O interface, temporarily disable data communication between the first and second I/O interfaces. The processor is also capable of executing the set of instructions to cause the apparatus to acquire a file from the detected first device via the first I/O interface, to determine whether the acquired file poses a security threat and, responsive to a determination that the acquired file does not pose a security threat, to enable the data communication between the first and second I/O interfaces. By disabling data communication between the first and the second I/O interfaces, the probability of inadvertent transmission of harmful software that poses security threat, before its harmful nature is discovered, can be reduced.

In some embodiments, after acquiring a file from the detected first interface via the first I/O interface and before the data communication between the first and second I/O interfaces are enabled, the apparatus can also detect a request to communicate data to the second I/O interface, and responsive to acquiring such a request, determine that the detected first device poses a security threat. In some embodiments, the apparatus can also detect that a second device is coupled with the second I/O interface, and determine whether the detected second device sends data to the apparatus via the second I/O interface before the data communication is enabled between the first and second I/O interfaces. If this is the case, the apparatus can determine that the second device also poses a security threat. By detecting for a request to send data to the I/O interfaces before data communication between the first and second I/O interfaces is enabled, detection of security threat can become more robust.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Reference will now be made in detail to the example embodiments, which are illustrated in the accompanying drawings. Wherever possible, the same reference numbers will be used throughout the drawings to refer to the same or like parts.

Figure 1:
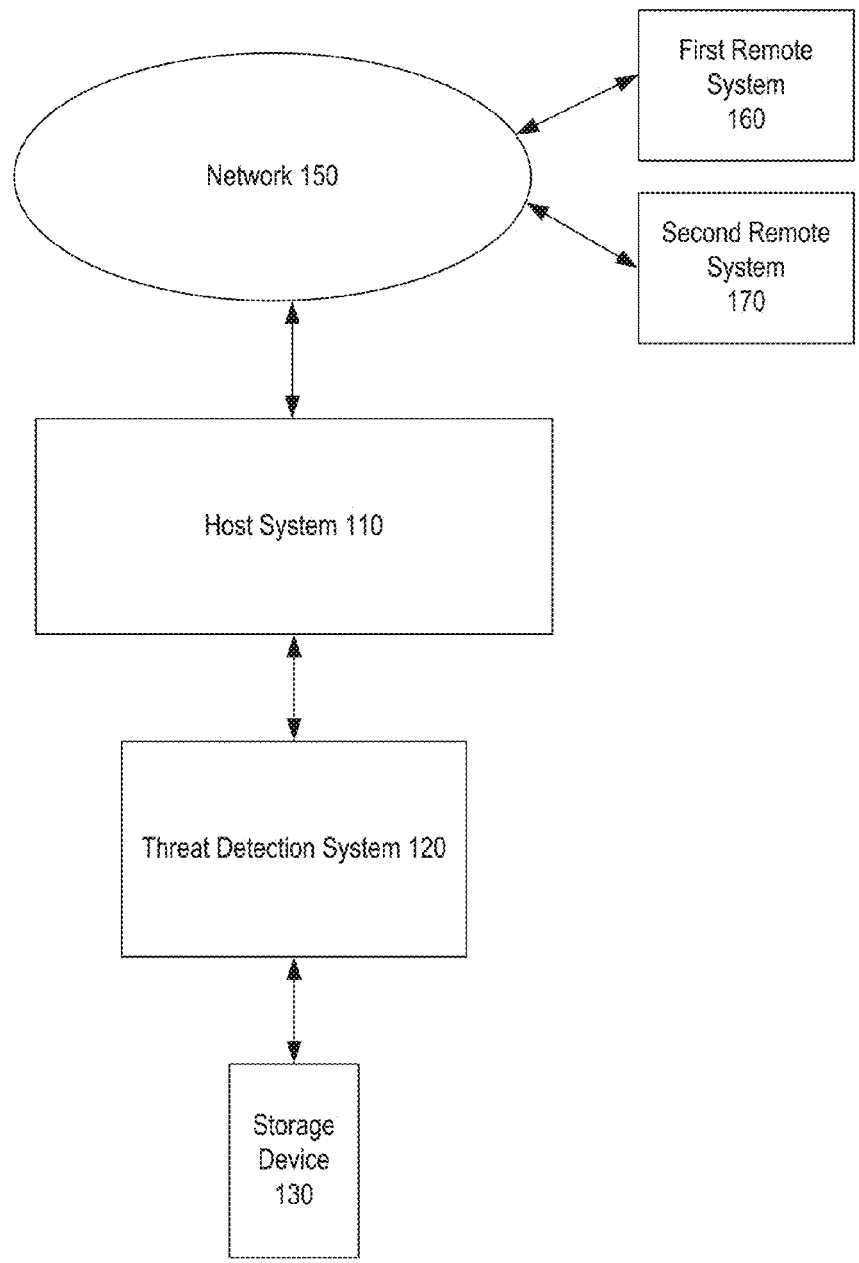
FIG. 1 is a block diagram of an exemplary system within which embodiments described herein can be used.

FIG. 1 is a block diagram of an exemplary system 100 within which embodiments described herein can be used. As shown in FIG. 1, system 100 includes a host system 110, a threat detection system 120, and a storage device 130, where storage device 130 can communicate with host system 110 via threat detection system 120. Storage device 130 can be any device that can store data. In some embodiments, storage device 130 can be any standalone non-volatile storage device, including but not limited to SD, Memory Stick™, flash memory device, SSD, portable hard drive, etc. Storage device 130 can also be part of a system (e.g., a hard drive of a computer). Host system 110 can be a system with a processor, and a memory device to store instructions to be executed by the processor, and can access network 150. Network 150 can be a communication network. Examples of communication networks include a local area network ("LAN") and a wide area network ("WAN"), e.g., the Internet.

Host system 110 can be configured to, for example, acquire a file from storage device 130 and provide the file data for other applications such as printing or displaying. If storage device 130 is allowed to directly connect to host system 110, and if storage device 130 is infected with malware, the malware residing in storage device 130 can copy itself into the memory of host system 110, and can cause the processor of host system 110 to, for example, spread the malware to other computers connected to network 150. Conversely, if host system 110 is infected with malware, the malware can also copy itself into storage device 130.

Threat detection system 120 acts as a gateway between host system 110 and storage device 130, to prevent computer virus, malware, or any other computer files that pose security threat, from being transferred between host system 110 and storage device 130. In some embodiments, threat detection system 120 scans storage device 130 to locate virus and/or malware, based on one or more configuration files pre-stored in threat detection system 120. Such configuration files may include information for threat signatures including file attributes of known computer viruses and malwares. Threat detection system 120 also detects suspicious activities originated from storage device 130 or from host system 110. Such suspicious activities may include, for example, attempts by storage device 130 to access host system 110, or vice versa, when storage device 130 and host system 110 should not be initiating communication with each other while threat detection system 120 is undergoing the scanning and detection. Once threat detection system 120 completes the scanning and detection, and confirms that the host system 110 and device 130 do not pose security threat, the threat detection system 120 allows host system 110 and device 130 to communicate with each other. As to be discussed later, threat detection system 120 includes a processor, and a memory device to store a set of instructions to cause the processor to carry out the scanning for virus and malware, the detection of suspicious activities, and the isolation of device 130. Although in FIG. 1 threat detection system 120 is connected to only one storage device 130, it is understood that threat detection system 120 can be connected to multiple devices.

In some embodiments, system 100 further includes a first remote system 160 and a second remote system 170, both of which communicate with host system 110 via network 150. Both systems 160 and 170 can be a computer similar to host system 110. System 160 can be used to update the configuration files stored in threat detection system 120, including the files which include threat signature information. System 170 can be used to update the software components of threat detection system 120. In some embodiments, either system 160 or 170 carries out the updating of both the configuration files and the software components of threat detection system 120 by, for example, providing the relevant files to host system 110, which can then transfer the files to threat detection system 120.

Figure 2:
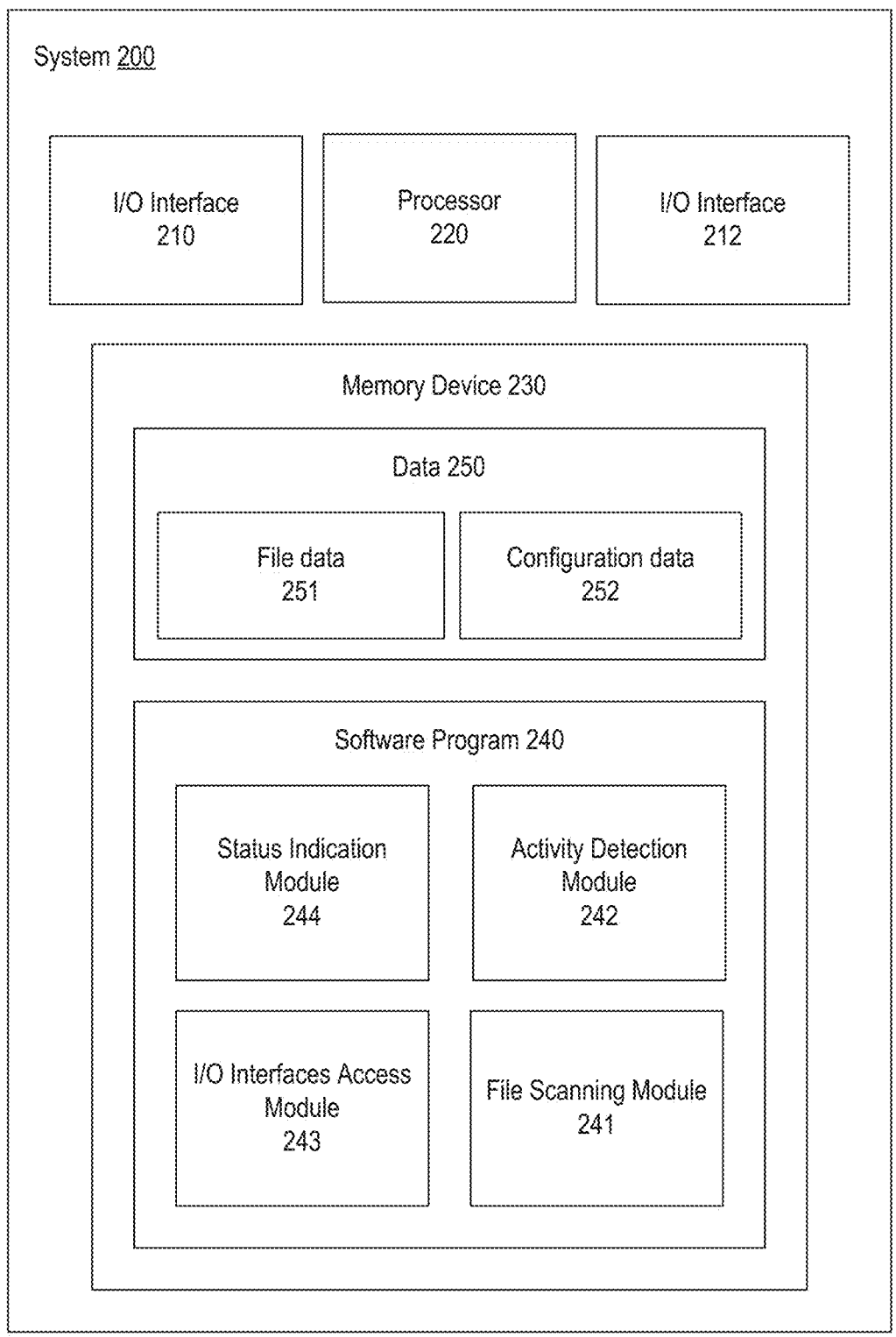
FIG. 2 is a block diagram of an exemplary system for scanning and isolating an external storage device.

FIG. 2 is a block diagram of an exemplary system 200 for scanning and isolating an external storage device. In some embodiments, threat detection system 120 of FIG. 1 can include similar features as system 200. As shown in FIG. 2, system 200 includes input/output (I/O) interfaces 210 and 212, a processor 220, and a memory device 230. In some embodiments, each of I/O interfaces 210 and 212 allow transferring of data between system 200 and an external device (e.g., storage device 130 and host system 110 of FIG. 1) according a specific I/O standard. Such I/O standard can include but not limited to: Universal Serial Bus (USB), Secure Digital Input Output (SDIO), High-Definition Multimedia Interface (HDMI), Institute of Electrical and Electronics Engineers (IEEE) 1394, etc. In some embodiments, each I/O interface includes a connector (not shown) used to physically connect with one of storage device 130 and host system 110, and further includes circuitries and systems to support the functionalities of the I/O interface. Although only two I/O interfaces are shown in FIG. 2, it is understood that system 200 can include more than two I/O interfaces. As an illustrative example, I/O interfaces 210 and 212 can be connected to, respectively, host system 110 and storage device 130.

Each of I/O interfaces 210 and 212 can be controlled by processor 220 when it executes a software program 240 stored in memory device 230. Software program 240 includes various modules including but not limited to: a file scanning module 241, an activity detection module 242, an I/O interfaces access module 243, and a status indication module 244. In some embodiments, software program 240 can be written using Java™ programming language. The source code files can be compiled into Java™ bytecodes. Memory device 230 can also be preloaded with a Java™ virtual machine (not shown in FIG. 2) to further interpret the compiled bytecodes to generate machine language, which can then be executed by processor 220. It is understood that software program 240 can be written using other computer languages other than Java™ and may not require memory device 230 to be preloaded with a virtual machine.

File scanning module 241 acquires information of the files stored in storage device 130 via I/O interface 212. In some embodiments, file scanning module 241 acquires information about a directory structure of the files stored in the storage device. The information may include a list of the files, the location of the files, the hierarchy of the directory structure, etc. Based on the directory structure, file scanning module 241 checks the attributes of each of the files stored in storage device 130 for security threat.

Activity detection module 242 detects traffic at the I/O interfaces, or a request to send data to the I/O interfaces, and determines whether such traffic or request is unexpected. In some instances, such traffic or request can indicate that a storage device is being connected to the I/O interface (e.g., after detecting a handshaking signal). In some instances, such traffic or request can signal the existence of computer viruses or malwares, when no such traffic or request is expected to occur. As an illustrative example, when system 200 is reading the files from storage device 130 via I/O interface 212, it may not expect to detect traffic at I/O interface 210, or a request to send data to I/O interface 210. This can be because, for example, that system 200 does not expect host system 110 to initiate transmission of data to storage device 130, given that the user is attempting to use host system 110 to access storage device 130, not the other way around. Moreover, system 200 also does not expect host system 110 to request data from storage device 130 (and storage device 130 also should not be sending data to host system 110 without receiving such a request), until host system 110 receives an indication from system 200 that storage device 130 is free of security threat, and system 200 has not sent such indication. Therefore, detecting traffic at I/O interface 210 or a request to send data to I/O interface 210, both of which are contrary to what system 200 expects, can signal that storage device 130 and/or host system 110 are infected. For example, a file that is acquired from storage device 130 by system 200, now residing in memory device 230, may include a malicious executable which causes processor 220 to attempt to send harmful data to I/O interface 210. Alternatively, host system 110 may be infected, and the virus or malware residing in host system 110 may attempt to send harmful data to I/O interface 210, with the intent that the data will be forwarded to storage device 130. In both cases, activity detection module 242 can determine that the traffic at I/O interface 210, or a request to send data to that interface, signals existence of a security threat.

I/O interfaces access module 243 controls and facilitates the access of each of I/O interfaces 210 and 212 by software program 240. In some embodiments, software program 240 implements a policy of isolating a device connected to I/O interface 212 (e.g., storage device 130) from another device connected to I/O interface 210 (e.g., host system 110), while file scanning module 241 is carrying out the scanning. For example, while file scanning module 241 is scanning storage device 130 via I/O interface 212, software program 240 instructs I/O interfaces access module 243 to restrict the data that can reach I/O interface 210, or to ignore a request (either generated within system 200, or received via I/O interface 212) to transmit data to I/O interface 210. I/O interfaces access module 243 also acquires data from I/O interface 212 and provides the data to, for example, file scanning module 241, when it scans the files. I/O interfaces access module 243 also provides the data to activity detection module 242, to alert the module about traffic at the interface, or to detect that an external device is connected to system 200. When no other device except host system 110 is connected, software program 240 also instructs I/O interfaces access module 243 to allow host system 110 to access system 200 via any of the I/O interfaces in order to, for example, update the configuration files and software program 240 itself.

Status indication module 244 provides status information about the scanning or detection of suspicious activity for displaying. In some embodiments, status indication module 244 receives a result of the scanning from scanning module 241, or a result of detection of activity from activity detection module 242, and provides the result to host system 110 via I/O interfaces access module 243, and the status can then be displayed at a display device attached to host system 110. In some embodiments, one or more output devices (e.g., light-emitting diodes (LED)) can also be connected to the I/O interfaces, and can be controlled by status indication module 244, via I/O interfaces access module 243, to indicate a status of the scanning or detection of suspicious activity.

Memory device 230 can also store data 250 used for the scanning. Data 250 may include file data 251 received from a device being scanned, and configuration data 252, which may include the signatures or attributes of a list of known computer viruses and malware. As discussed above, configuration data 252, as well as any portion of software program 240, can be updated by another system via the I/O interfaces. In some embodiments, configuration files can be created with Extensible Markup Language (XML), which can be readily parsed by, for example, file scanning module 241.

Figure 3:
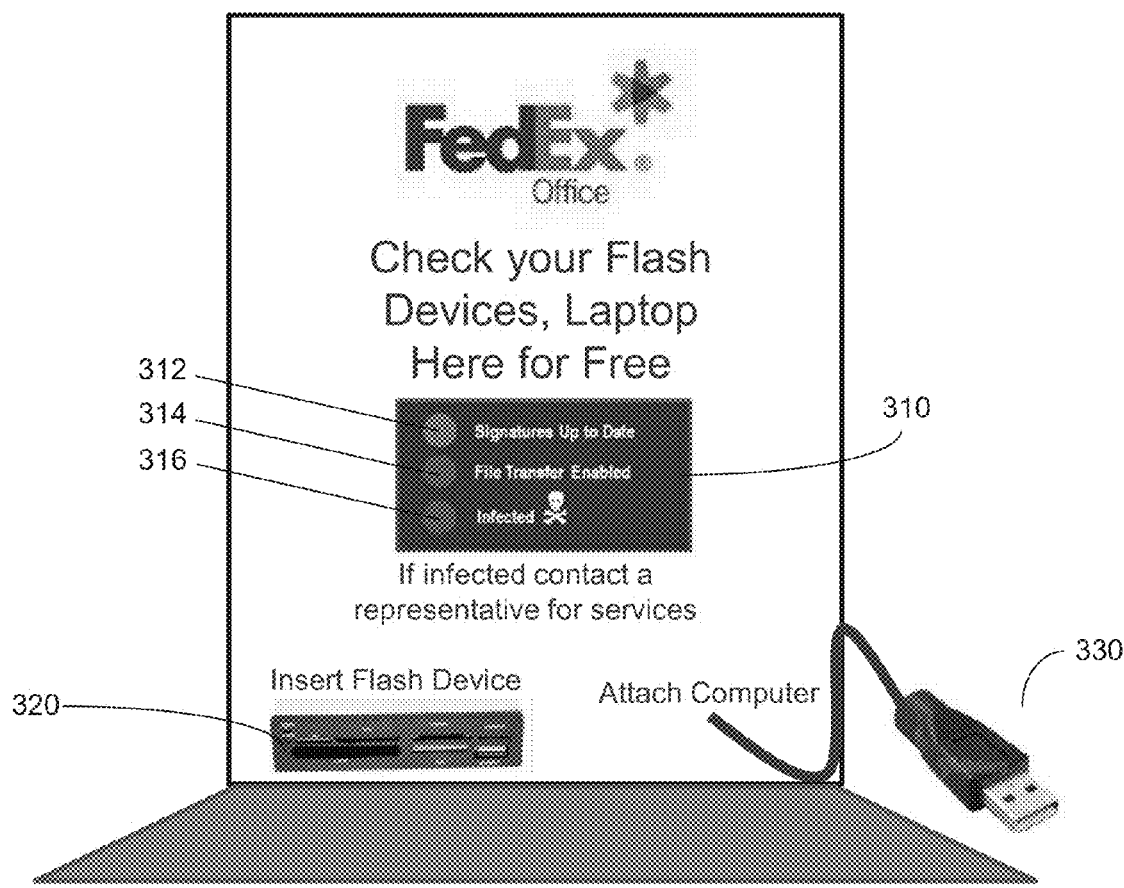
FIG. 3 is a diagram depicting an exemplary kiosk for scanning and isolating an external storage device.

FIG. 3 is a diagram depicting an exemplary kiosk 300 for scanning and isolating an external storage device. Various functionalities of kiosk 300 can be provided by system 200 illustrated in FIG. 2. As shown in FIG. 3, kiosk 300 includes a display interface 310, which includes indicators 312, 314, and 316. Each indicator can be an LED or other lighting device, and is connected to the I/O interfaces of system 200. Each indicator can be activated to indicate a status of the scanning of the external storage device. For example, indicator 312 can be activated to indicate that the security threat signatures stored in system 200, used for detecting whether a file stored in the external storage device carries a security threat, is up to date. Indicator 314 can be activated to indicate that the scanning of the external device is complete, and that no threat is detected in the external device, therefore file transfer from that external device is enabled. Indicator 316 can also be activated to indicate that during the scanning of the external device, a security threat is detected.

Kiosk 300 further includes connectors 320 and 330. Connectors 320 and 330 can be respectively connected to, for example, I/O interfaces 210 and 212 of system 200, and can be managed by I/O interfaces access module 243 of system 200. Connectors 320 include a collection of female connectors for different I/O standards, such as USB, SDIO, HDMI, IEEE 1394, etc. Connectors 320 allow a user to connect a standalone storage device with a male connector, such as a USB jump drive or a SD card, with kiosk 300 (and system 200). Connectors 330 include a collection of male connectors for the aforementioned I/O standards. Connectors 330 allow a user to connect the kiosk to, for example, a computer with a hard drive, or any other standalone storage device with a female connector. Via connectors 320 and 330, system 200 scans security threats in the storage device, and then reports a status of the scanning via the indicators of display interface 310.

Figure 4:
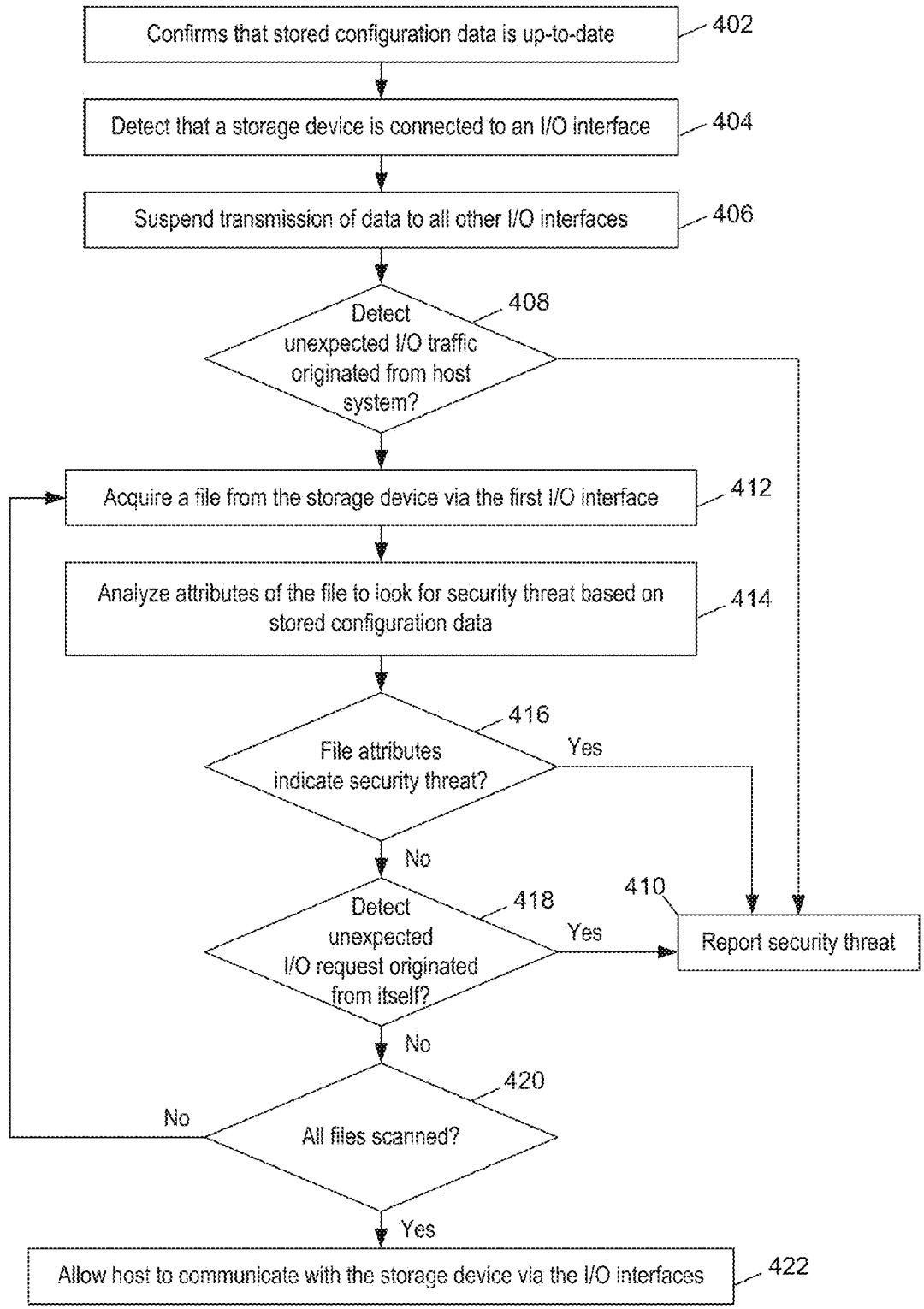
FIG. 4 is a flowchart representing an exemplary method performed by an electronic device for scanning and isolating an external storage device.

FIG. 4 is a flowchart representing an exemplary method 400 performed by an electronic device (e.g., threat detection system of FIG. 1 and system 200 of FIG. 2) for scanning and isolating an external storage device. While the flowchart discloses the following steps in a particular order, it will be appreciated that at least some of the steps can be moved, modified, or deleted where appropriate, consistent with the teachings of the present disclosure. And while the following steps are indicated as being performed by an electronic device, it is appreciated that the steps can be performed by more than one electronic device. For illustration purpose only, for the following description it is assumed the electronic device is system 200 of FIG. 2, and that host system 110 of FIG. 1 is connected to I/O interface 210 of FIG. 2.

In step 402, the electronic device confirms that its stored configuration data (e.g., configuration data 252 of FIG. 2) is up-to-date. The configuration data can include a list of most up-to-date security threat signatures, and can be associated with a date. The electronic device confirms that the configuration data is up-to-date by, for example, communicating with other systems (e.g., remote systems 160 and/or 170 in FIG. 1) to confirm that its configuration data is up-to-date, based on the date associated with the configuration data, and if not, acquire up-to-date configuration data from these systems. In some embodiments, step 402 can be omitted if, for example, the configuration data stored in the electronic device is updated manually with the latest data.

In step 404, the electronic device detects that storage device 130 in FIG. 1 is connected to one of its available I/O interfaces (e.g., I/O interface 212 in FIG. 2). The detection can be performed by, for example, detecting a handshake signal initiated by the storage device at the I/O interface.

In step 406, after detecting that storage device 130 is connected at one of its I/O interface, the electronic device disables transmission of data to all other I/O interfaces, except to I/O interface 212. This is to prevent harmful files stored in storage device 130, if any, from accessing other devices connected to the electronic device. The disabling can be achieved by, for example, actively ignoring a request (either generated within the electronic device, or received via an I/O interface) to transmit data to all other I/O interface. In some embodiments, the disabling can be carried out by I/O interfaces access module 243 in FIG. 2.

In step 408, after disabling transmission of data to all other I/O interfaces in step 406, the electronic device detects whether there is unexpected I/O traffic originated from host system 110. Such I/O traffic can be either a request from host system 110 to acquire data from storage device 130, or an attempt from host system 110 to send data to storage device 130. For the first case, the electronic device does not expect I/O traffic from host system 110 because, for example, that the user is attempting to use host system 110 to access storage device 130, not the other way around. For the second case, the electronic device also does not expect host system 110 to acquire data from storage device 130 until it receives an indication from the electronic device that storage device 130 is free of security threat, and the electronic device has not sent such indication. The detection can be performed by, for example, activity detection module 242 of FIG. 2. Responsive to detecting such I/O traffic, the electronic device determines that there is a security threat, potentially posed by host system 110, and can carry out step 410 to report a security threat. The data for such reporting can be generated by status indication module 244. On the other hand, if the electronic device detects no unexpected I/O traffic originated from host system, the electronic device can carry out step 412.

In step 412, the electronic device acquires a file from storage device 130. In some embodiments, the electronic device may acquire information about a directory structure of the files stored in storage device 130, and then acquire the files according to the information. The acquired file data can be temporarily stored in the memory of the electronic device.

In step 414, after the file data is acquired, the electronic device analyzes attributes of the file for security threat. In some embodiments, the electronic device compares the signature or other attributes of the file against the corresponding attributes of a list of known viruses and malwares from the configuration data updated in step 402.

In step 416, the electronic device determines whether the file poses security threat based on a result of the analysis in step 414. If the analysis indicates that the file poses security threat, the electronic device can carry out step 410 to report a security threat. On the other hand, if the analysis does not indicate that the file poses security threat, the electronic device can carry out step 418. In some embodiments, steps 412 through 416 are carried out by file scanning module 241 of FIG. 2.

In step 418, the electronic device determines whether there is unexpected I/O request generated by the electronic device itself. For example, the electronic device may not expect to receive a request to send data to host system 110 via I/O interface 210 (connected to host system 110) while it is processing the file from storage device 130 via I/O interface 212. This can be because, for example, that storage device 130 should not send data to host system 110 without first receiving a request for data from host system 110, and the electronic device has verified that host system 110 has not sent such a request in step 408. A request to send data via I/O interface 210 can be detected by, for example, activity detection module 242 of FIG. 2. If such a request is detected, the electronic device can carry out step 410 to report a security threat. If such a request is not detected, the electronic device will carry out step 420 by checking whether all the files have been scanned, based on, for example, the information about the directory structure of the files stored in storage device 130. If all the files are scanned, the electronic device can carry out step 422, where the electronic devices allows storage device 130 to communicate with host system 110. If there are files remaining that are not scanned, the electronic device will go back to step 412 to acquire the next file in the directory structure, and repeat the analysis according to steps 412 through 418, until all the files are scanned.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus for detecting a security threat, the apparatus comprising:
 a first input/output (I/O) interface and a second I/O interface;
 a memory device that stores a set of instructions; and
 a processor configured to execute the set of instructions to:
  detect that a first device is coupled with the first I/O interface;
  responsive to the detection that the first device is coupled with the first I/O interface, temporarily disable data communication between the first and second I/O interfaces;
  acquire a file from the detected first device via the first I/O interface;
  monitor for a request to communicate data to the second I/O interface;
  if the request to communicate data to the second I/O interface is detected, determine that the first device poses a security threat;

responsive to a determination that the acquired file does not pose a security threat, enable the data communication between the first and second I/O interfaces.

2. The apparatus of claim 1, wherein the processor is further configured to execute the set of instructions to:
detect that a second device is coupled with the second I/O interface;
determine whether the detected second device sends data to the apparatus via the second I/O interface before the data communication is enabled between the first and second I/O interfaces; and
responsive to a determination that the detected second device sends data to the apparatus via the second I/O interface before the data communication is enabled between the first and second I/O interfaces, determine that the second device poses a security threat.

3. The apparatus of claim 1, wherein the processor is further configured to execute the set of instructions to:
store first configuration data for determining whether the acquired file poses a security threat, the first configuration data being associated with a first timestamp;
based on the first timestamp, determine whether the first configuration data is up-to-date; and
responsive to a determination that the first configuration data is not up-to-date, acquire second configuration data associated with a second timestamp, the second configuration data being acquired to replace the first configuration data.

4. The apparatus of claim 3, wherein at least one of the first and second configuration data includes attributes of one or more computer viruses and malwares.

5. The apparatus of claim 1, wherein the processor is further configured to execute the set of instructions to:
acquire information about a directory structure of one or more files stored in the first device;
determine whether all the files stored in the first device have been acquired, based on the acquired information about the directory structure; and
responsive to a determination that all the files stored in the first device have been acquired, and that none of the acquired files poses a security threat, enable the data communication between the first and second I/O interfaces.

6. The apparatus of claim 1, further comprising a first connector and a second connector, the first connector and the second connector being coupled with the first I/O interface and with the second I/O interface respectively.

7. The apparatus of claim 1, further comprising one or more output devices to indicate that the apparatus enables the data communication between the first and second I/O interfaces, and/or to indicate that a device coupled with the first or the second I/O interfaces poses a security threat.

8. A computer-implemented method of detecting a security threat, comprising:
detecting that a first device is coupled with a first input/output (I/O) interface;
responsive to detecting that the first device is coupled with the first I/O interface, temporarily disabling data communication between the first I/O interface and a second I/O interface;
acquiring a file from the detected first device via the first I/O interface;
monitoring for a request to communicate data to the second I/O interface;
if the request to communicate data to the second I/O interface is detected, determine that the first device poses a security threat;

responsive to determining that the acquired file does not pose a security threat, enabling the data communication between the first and second I/O interfaces.

9. The method of claim 8, further comprising:
detecting that a second device is coupled with the second I/O interface;
determining whether the detected second device sends data to the second I/O interface before the data communication is enabled between the first and second I/O interfaces; and
responsive to determining that the detected second device sends data to the second I/O interface before data communication is enabled between the first and second I/O interfaces, determining that the second device poses a security threat.

10. The method of claim 8, further comprising:
storing first configuration data for determining that the acquired file poses a security threat, the first configuration data being associated with a first timestamp;
based on the first timestamp, determining whether the first configuration data is up-to-date; and
responsive to determining that the first configuration data is not up-to-date, acquiring second configuration data associated with a second timestamp, the second configuration data being acquired to replace the first configuration data.

11. The method of claim 10, wherein at least one of the first and second configuration data includes attributes of one or more computer viruses and malwares.

12. The method of claim 8, further comprising:
acquiring information about a directory structure of one or more files stored in the first device;
determining whether all the files stored in the first device have been acquired, based on the acquired information about the directory structure; and
responsive to determining that all the files stored in the first device have been acquired, and that none of the acquired files poses a security threat, enabling data communication between the first and second I/O interfaces.

13. A non-transitory computer readable medium that stores a set of instructions that are executable by at least one processor of an electronic device to cause the electronic device to perform a method of detecting a security threat, the method comprising:
detecting that a first device is coupled with a first input/output (I/O) interface;
responsive to detecting that the first device is coupled with the first I/O interface, temporarily disabling data communication between the first I/O interface and a second I/O interface;
acquiring a file from the detected first device via the first I/O interface;
monitoring for a request to communicate data to the second I/O interface;
if the request to communicate data to the second I/O interface is detected, determine that the first device poses a security threat;
and
responsive to determining that the acquired file does not pose a security threat, enabling the data communication between the first and second I/O interfaces.

14. The non-transitory computer readable medium of claim 13, wherein the method further comprises:
detecting that a second device is coupled with the second I/O interface;

determining whether the detected second device sends data to the second I/O interface before the data communication is enabled between the first and second I/O interfaces; and responsive to determining that the detected second device sends data to the second I/O interface before the data communication is enabled between the first and second I/O interfaces, determining that the second device poses a security threat.

15. The non-transitory computer readable medium of claim 13, wherein the method further comprises:

storing first configuration data for determining that the acquired file poses a security threat, the first configuration data being associated with a first timestamp;

based on the first timestamp, determining whether the first configuration data is up-to-date; and responsive to determining that the first configuration data is not up-to-date, acquiring second configuration data associated with a second timestamp, the second configuration data being acquired to replace the first configuration data.

16. The non-transitory computer readable medium of claim 15, wherein at least one of the first and second configuration data includes attributes of one or more computer viruses and malwares.

17. The non-transitory computer readable medium of claim 13, wherein the method further comprises:

acquiring information about a directory structure of one or more files stored in the first device;

determining whether all the files stored in the first device have been acquired, based on the acquired information about the directory structure; and responsive to determining that all the files stored in the first device have been acquired, and that none of the acquired files poses a security threat, enabling the data communication between the first and second I/O interfaces.

* * * * *

UNITED STATES PATENT AND TRADEMARK OFFICE
CERTIFICATE OF CORRECTION

PATENT NO. : 9,537,882 B2  
APPLICATION NO. : 14/577405  
DATED : January 3, 2017  
INVENTOR(S) : Christopher Perry Patteson et al.

Page 1 of 1

It is certified that error appears in the above-identified patent and that said Letters Patent is hereby corrected as shown below:

On the Title Page

Item (73) Assignee, "FEDEX CORPORATED SERVICES, INC., Collierville, TN (US)" should read -- FEDEX CORPORATE SERVICES, INC., Collierville, TN (US) --.

Signed and Sealed this  
Eleventh Day of April, 2017

Michelle K. Lee  
*Director of the United States Patent and Trademark Office*